United States Patent

Shintani et al.

[15] 3,670,251

[45] June 13, 1972

[54] SYSTEM FOR DEMODULATING AN AMPLITUDE-MODULATED TELEGRAPHIC WAVE OR WAVES

[72] Inventors: Sotokichi Shintani; Kazuo Kawai, both of Tokyo; Hidetaka Yanagidaira, Ohmiya, all of Japan

[73] Assignee: Kokusai Denshin Denwa Kabushihi Kaisha, Tokyo-to, Japan

[22] Filed: Sept. 10, 1970

[21] Appl. No.: 71,082

[30] Foreign Application Priority Data

Sept. 12, 1969 Japan....................................44/72463

[52] U.S. Cl.................................329/109, 178/88, 325/321, 328/118, 329/104

[51] Int. Cl..........................................................H03k 9/02

[58] Field of Search..................329/104, 105, 109; 307/236; 328/118, 119; 340/347 AD; 325/321; 178/88

[56] References Cited

UNITED STATES PATENTS

| | | | |
|---|---|---|---|
| 3,062,442 | 11/1962 | Boensel et al. | 340/347 AD |
| 3,473,132 | 10/1969 | Keeler et al. | 329/104 X |
| 3,483,474 | 12/1969 | Meranda | 329/104 X |

*Primary Examiner*—Alfred L. Brody
*Attorney*—Robert E. Burns and Emmanuel J. Lobato

[57] ABSTRACT

A system for demodulating at least one amplitude-modulated telegraphic wave by comparing a detected envelope of the amplitude-modulated telegraphic wave with a threshold level, in which the detected envelope is converted to digital code units for each signal element of the amplitude-modulated telegraphic wave while the threshold level is also indicated by a reference code unit, so that the above-mentioned comparison operation is performed by digital circuitry. The reference code unit is corrected by the use of an accumulated result of successive ones of the above comparison.

2 Claims, 5 Drawing Figures

Fig. 1

SYSTEM FOR DEMODULATING AN AMPLITUDE-MODULATED TELEGRAPHIC WAVE OR WAVES

This invention relates to a system for demodulating an amplitude-modulated telegraphic wave or waves.

There has been heretofore proposed a system of the type in which an amplitude-modulated telegraphic wave is envelope-detected and the level of the detected output is compared with a reference voltage (i.e.; a threshold level) for each signal element so that a telegraphic signal transmitted by the amplitude modulation is demodulated from the comparison result. However, since an instantaneous level of the input telegraphic wave fluctuates in response to level fluctuation in a transmission medium, the reference voltage need to follow with this fluctuation. Accordingly, the reference voltage is usually controlled by an automatic voltage control system, which operates by the use of a detected output obtained by detecting the above-mentioned fluctuation of the level of input telegraphic wave. However, since operations are usually performed in the analogue manner in conventional systems, "-drift" should be sufficiently reduced. In a case where the system is designed by use of transistors, this drift is affected also by temperature. Accordingly, complicated problems such as temperature compensation must be resolved.

An object of this invention is to provide a system for demodulating an amplitude-modulated telegraphic wave or waves, and to eliminate the above-mentioned defects of conventional systems.

Another object of this invention is to provide a miniaturized system for time-divisionally demodulating an amplitude-modulated telegraphic waves.

Still another object of this invention is to provide a system for demodulating an amplitude-modulated telegraphic wave or waves in high preciseness and high stability.

The principle of this invention will be understood from the following detailed discussion taken in conjunction with the accompanying drawings, in which.

Figure 1:
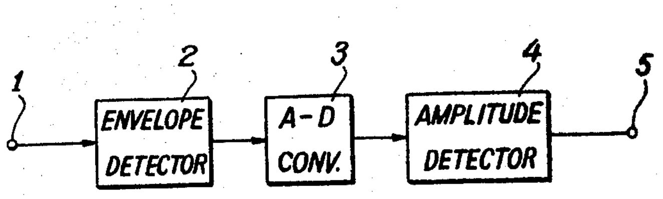
FIG. 1 is a block diagram explanatory of the principle of this invention.

With reference to FIG. 1, an example of this invention applied to demodulate a simple amplitude-modulated telegraphic wave comprises an input terminal 1, an envelope detector 2, an analogue-digital (A-D) converter 3, an amplitude detector 4 and an output terminal 5.

An input telegraphic wave applied to the input terminal 1 is envelope-detected by the envelope detector 2 so that envelope detector 2 produces an output voltage proportional to the amplitude of the input telegraphic wave. This output voltage is applied to the A-D converter 3, in which the applied voltage is sampled for each signal element and converted to PCM code units of six digits by way of example. These PCM code units are successively compared with a reference code unit in the amplitude detector 4 which is described in details below. The amplitude detector 4 compares respective PCM code units with the reference code unit by the use of a digital operating device so as to demodulate a transmitted telegraphic signal from the comparison result. In this case, the reference code unit is controlled by a circuit detecting level fluctuation from the PCM code units.

Figure 2:
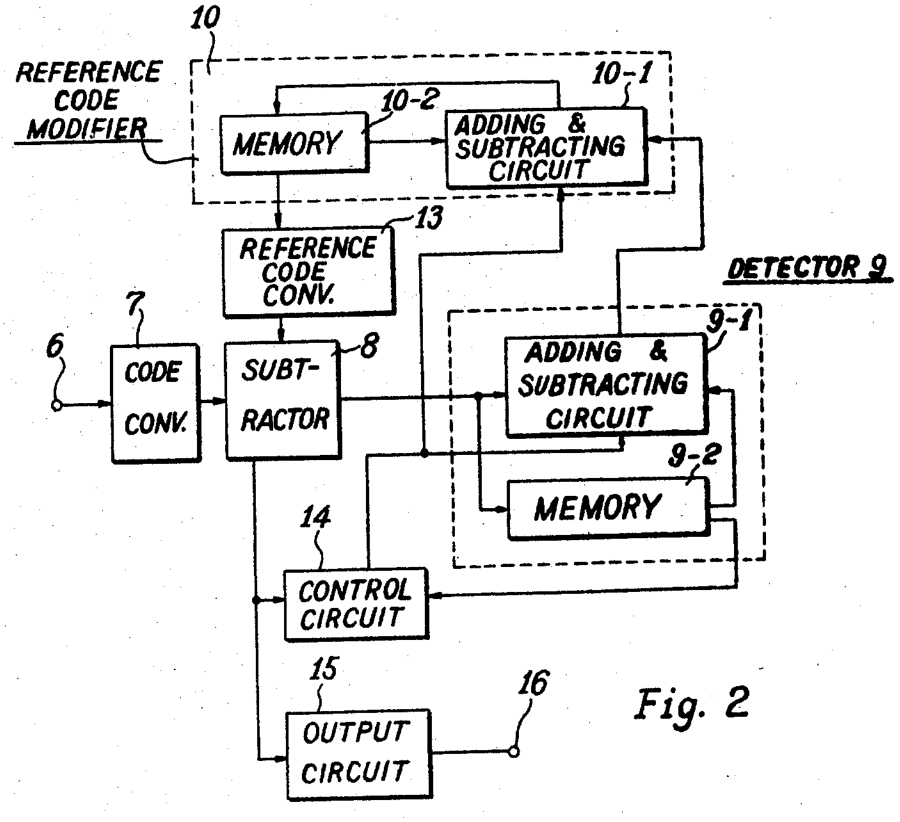
FIG. 2 is a block diagram illustrating an example of an amplitude detector employed in the block diagram shown in FIG. 1.

With reference to FIG. 2, an example of the amplitude detector 4 comprises an input terminal 6, a code converter 7, a subtractor 8, a detector 9 used to detect fluctuation, a reference code modifier 10, a reference code converter 13, a control circuit 14 instructing addition operation or subtraction operation to an adding and subtracting circuit 9–1, an output circuit 15 and an output terminal 16. The detector 9 comprises the adding and subtracting circuit 9–1 and a memory 9–2. The reference code modifier 10 comprises an adding & subtracting circuit 10–1 and a memory 10–2.

In operation, a six-digit code unit indicative of amplitude information is applied from the input terminal 6 to the code converter 7. The number of digits of the input code unit is appropriately determined so as to satisfy accuracy requirements. The code converter 7 converts the number of digits of the input PCM code units so as to make all the code units applied to logical operating circuit shown in FIG. 2 uniform. In this circuit, it is assumed that all the code units are converted to code units of eleven digits. In each of the converted code units, a most significant digit (i.e.; sign digit) indicates the polarity of a sampled level corresponding to this code unit. The converted code unit obtained from the code unit converter 7 is applied to the subtractor 8. On the other hand, a code obtained from the reference code converter 13 in a manner described below is also applied to the subtractor 8. In the subtractor 8, a subtracting operation for subtracting the output code of the reference code converter 13 from the output code of the code converter 7. Only a sign digit of a result of this subtracting operation is read out by the output circuit 15 to the output terminal 16, so that demodulation of the input telegraphic wave is performed. In other words, if the subtracted result is positive (the sign digit assumes the state "0"), the sampled element corresponding to the detected code unit is determined as a mark signal. On the other hand, if the subtracted result is negative (the sign digit assumes the state "1"), the sampled element corresponding to the detected code unit is determined as a space signal.

The output signal of the subtractor 8 is applied to the adding and subtracting circuit 9–1 of the detector 9. The adding and subtracting circuit 9–1 performs addition or subtraction relating to the output of the subtractor 8 and a below-described output of the memory 9–2 under control of the control circuit 14. In this case, the control circuit 14 compares the sign digit at the output of the subtractor 8 with the sign digit of a code unit stored in the memory 9–2, so that the control circuit instructs the adding & subtracting circuit 9–1 so as to perform the above-mentioned subtraction and addition in accordance with the same polarity and different polarities of the compared sign digits respectively. The memory circuit 9–2 stores a subtracted result for an immediately preceding signal element, while the state of the memory circuit 9–2 is established to a predetermined state (e.g. a state 0). In this case, it is assumed that a subtracted result for an immediately preceding signal element is stored in the memory 9–2 from the subtractor 8 for simple explanation. After the contents of the memory 9–2 are applied to the adding & subtracting circuit 9–1, a subtracted result of the subtractor 8 for the instant signal element is newly stored. The above mentioned addition and subtraction operations in the adding and subtracting circuit 9–1 correspond to detection of the level fluctuation in the input telegraphic wave, so that a detected error is obtained at the output of the adding and subtracting circuit 9–1.

This output of the adding and subtracting circuit 9–1 is applied to an adding and subtracting circuit 10–1 of the reference code modifier 10. This adding & subtracting circuit 10–1 performs addition operation and subtracting operation relating to the output of the adding and subtracting circuit 9–1 and the memory 10–2 under control of the control circuit 14 in a manner similar to the operation in the adding and subtracting circuit 9–1. In other words, if the output of the subtractor 8 has the same sign digit as a code unit, which is obtained from the subtractor 8 for the immediately preceding signal element and stored in the memory 9–2, the adding and subtracting circuit 10–1 performs subtracting operation for two inputs thereof under control of the control circuit 14. However, if the output of the subtractor 8 and the code unit stored in the memory 9–2 have different polarities from each other, adding operation for two inputs of the adding and subtracting circuit 10–1 is performed. In this case, the above mentioned subtracting operation in the adding and subtracting circuit 10–1 is performed so as to subtract the output of the adding and subtracting circuit 9–1 from the contents of the memory 10–2. A result of this subtracting or adding operation in the adding and subtracting circuit 10–1 is newly stored in the memory circuit 10–2. The configuration of a code unit stored in the memory 10–2 has 11 digits including a sign digit. In this case, upper seven digits in the 11 digits are indicative of a reference signal including a sign digit, while lower four digits in the 11 digits are empty bits. Errors obtained from the adding and subtracting circuit 10–1 are successively accumulated in the four empty bits of the memory 10–2. If the errors accumulated in the four empty bits are overflowed in excess of the four digits, the reference signal indicated by the upper seven digits is corrected. The number of the empty bits can be suitably determined. The upper seven digits stored in the memory 10–2 so as to indicate the reference signal are read out to the reference code converter 13, in which the read out seven digits are converted to a code unit of eleven digits so as to apply the converted code unit to the subtractor 8.

Figure 3A:
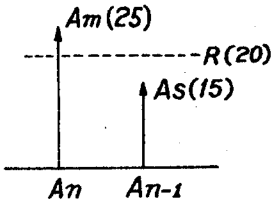
FIGS. 3A and 3B are diagrams explanatory of operations of the example shown in FIG. 2.
Figure 3B:
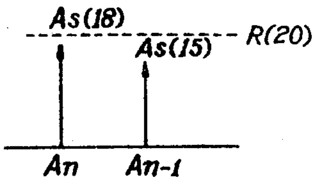

With reference to FIGS. 3A and 3B, operations of the amplitude detector 4 shown in FIG. 2 will be further described in details. In FIGS. 3A and 3B, references $A_n$ and $A_{n-1}$ show respectively an instant signal element and an immediately preceding signal element, and references $A_m$ and $A_s$ show respectively mark and space respectively. A reference R shows a reference signal (threshold level), which corresponds to the reference code unit obtained from the reference code converter 13. Numerals in parentheses are decimal numbers indicative of examples of respective levels of the corresponding signals. In FIG. 3A, an ideal condition in which there is no level fluctuation is shown. In this case, an immediately preceding space signal $A_s$ having a level (15) is applied to the subtractor 8, in which subtracting operation subtracting the reference signal R(20) from the signal $A_s$ (15) is performed in the subtractor 8. The subtracted result (15 – 20 = –5) has been stored in the memory 9–2. Accordingly, when the instant mark signal $A_m$ is applied to the input terminal 6, the contents of the memory 9–2 assume a state "–5." On the other hand, the reference code unit indicative of the reference signal R(20) is stored in the memory 10–2 in a state shifted by four bits to the upper side. If the reference code unit is indicated by binary code configuration, the reference code unit R(20) is stored in a state (101000000) = 20 × 16 = 320 shifted by four digits, while a decimal number "20" corresponds to a binary number "1 0 1 0 0". The reference code converter 13 reads out only upper five bits "1 0 1 0 0".

Next, if the mark signal $A_m$(25) is applied to the subtractor 8, a subtracting operation (25 – 20 = 5) subtracting the reference code unit R from the mark signal $A_m$ is performed in the subtractor 8. Since the subtracted result assumes positive, the mark signal $A_m$ is determined as "a mark signal" by the output circuit 15. Moreover, the result (+5) is applied to the detector 9 to detect fluctuation by the adding and subtracting circuit 9–1 with reference to contents (–5) of the memory 9–2. In this case, since the control circuit 14 detects that the output of the subtractor 8 and the contents of the memory 9–2 assume different polarities from each other, the adding & subtracting circuit 9–1 performs adding operation of two inputs (–5) and (+5). Accordingly, a result zero is obtained from the adding and subtracting circuit 9–1. In this case, no level fluctuation is detected so that the reference code unit R (20) stored in the memory 10–2 is not at all varied. If the instant signal $A_n$ assumes a state $A_m$ (30) in response to level fluctuation, the output of the subtractor 8, the output of the adding and subtracting circuit 9–1 and the output of the adding and subtracting circuit 10–1 assume respectively a state "30 – 20 = 10", a state "(–5) + (+10) = 5" and a state "(320)+(+5) = 325 = 1 0 1 0 0 0 1 0 1." Accordingly, the contents of the memory 10–2 assumes a state "1 0 1 0 0 0 1 0 1." If an accumulated result for the successive signal element exceeds a state "1 0 0 0 0" corresponding to a decimal number "16," the reference code unit R is modified from the state (20) to a state (21).

Next, if the instant signal $A_n$ assumes a space state $A_s$ having a level state (18) as shown in FIG. 3B, subtracting operation "(18) – (20) = –2" subtracting the reference code unit R from the space signal $A_s$ is performed in the subtractor 8. In response to a negative polarity of this subtracted result, this space signal $A_s$ is determined as "space signal" by the output circuit 15. In this case, since the output (–2) of the subtractor 8 and the contents (–5) of the memory 9–2 assume the same polarity, the adding and subtracting circuit 9–1 performs subtracting operation "(–5)–(–2)=–3." On the other hand, the adding and subtracting circuit 10–1 performs subtracting operation "(320) – (–3) = 323." so that the contents of the memory 10–2 are modified as a state "1 0 1 0 0 0 0 1 1" corresponding to the decimal number "323."

As mentioned with reference to FIGS. 3A and 3B, the amplitude-modulated telegraphic wave is demodulated by comparison with the reference signal for each signal element. Moreover, an error is detected for each signal element by comparison between respective comparison results obtained relating to two successive signal elements, so that the reference signal is correctly controlled by the use of an accumulated output of errors for successive signal elements.

The above explanation relates to a system for demodulating an amplitude-modulated telegraphic wave transmissible of one channel of digital information. If a plurality of amplitude-modulated telegraphic waves are simultaneously demodulated, the envelope detector 2, the A-D converter 3 and the amplitude detector 4 are designed so as to perform time-divisional operations for a plurality of amplitude-modulated telegraphic waves. In this case, a plurality of memories 9–2 and a plurality of memories 10–2 may be provided, so that the numbers of them are respectively equal to the number of amplitude-modulated telegraphic waves, and so that the memories 9–2 and the memories 10–2 are successively switched in each group in synchronism with the time-divisional operation of the system. Moreover, each of the memory 9–2 and the memory 10–2 may be designed by a delay line having a delay time equal to N times the interval of clock pulses of the time-divisional operation; where N is the number of amplitude-modulated telegraphic waves to be demodulated by this system. In this case, switching of contents of the memory 9–2 and the memory 10–2 are automatically performed in synchronism with the time-divisional operation of the system.

Figure 4:
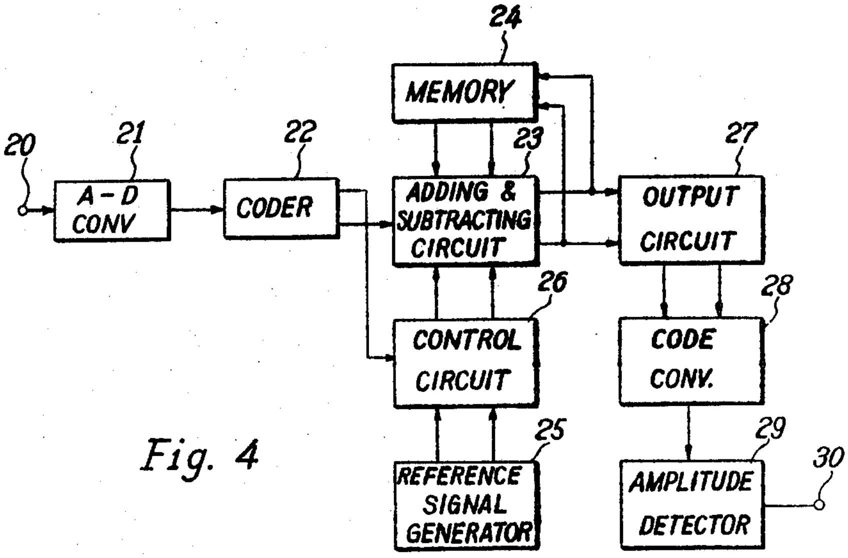
FIG. 4 is a block diagram illustrating an example of the system of this invention applied to demodulate amplitude-modulation in an amplitude- and phase-modulated telegraphic wave or waves.

With reference to FIG. 4, another example of this invention applied to demodulate amplitude-modulation of an amplitude- and phase-modulated telegraphic wave comprises an input terminal 20 of the input amplitude- and phase-modulated telegraphic wave, an A-D converter 21 performing sampling and quantizing operations for the input telegraphic wave, a coder 22, a reference signal generator 25, an adding and subtracting circuit 23, a control circuit 26, a memory 24, an output circuit 27, a code converter 28, an amplitude detector 29 and an output terminal for a demodulated output.

In operation, the input telegraphic wave applied to the input terminal 20 is sampled by the A-D converter 21 by the use of sampling pulses having a repetition frequency sufficiently higher than a frequency of a carrier of the input amplitude- and phase-modulated telegraphic wave and then quantized by the use of an appropriate number of quantum levels. The output of the A-D converter 21 is applied to the coder 22 and coded to digital code units. It is assumed that the code configuration of the output code units of the coder 22 is a parallel binary PCM code of seven digits. The number of digits can be appropriately determined. The above operations correspond to an operation of an ordinary PCM coder. Six digits indicative of an absolute value of an instantaneous level of the input telegraphic wave at a sampling time slot are applied to the adding and subtracting circuit 23 performing parallel operations for the six digits, while a bit of information (i.e.; sign digit) is applied to the control circuit 26 controlling adding and subtracting of the adding and subtracting circuit 23. The reference signal generator 25 generates two reference waves having a phase difference of 90° from each other by the use of an independent oscillator of high stability, which generates a signal having a frequency substantially equal to the frequency of the carrier of the input telegraphic wave. The above two reference waves are alternately applied to the control circuit 26. The control circuit 26 performs polarity-comparison operation relating to the sign digit and one of the two reference signals, so that an instruction signal for addition or an instruction signal for subtraction is applied to the adding and subtracting circuit 23 in response to the same polarity and different polarities of the above-mentioned compared signals. The adding and subtracting operations in the adding and subtracting circuit 23 correspond to phase-detection of the input amplitude- and phase-modulated telegraphic wave. A result of this adding or subtracting operation is stored in the memory 24, and a next result of the adding or subtracting operation is accumulated to the preceding result in the memory 24. The above-mentioned accumulation corresponds to integration operation. As mentioned above, logical operations for the two reference carriers are alternately performed, so that successive results obtained respectively for the two reference carriers are stored in the memory 24. The above-mentioned phase-detection operation and integration operation are repeatedly performed during a signal element of the input amplitude- and phase-modulated telegraphic wave, and two adding and subtracting results are read out from the adding and subtracting circuit 23 to the output circuit 27. If it is assumed that the input telegraphic wave has an amplitude A and respective phase differences between the input telegraphic wave and the two reference carriers are values $\theta$ and $\theta - 90°$, two outputs proportional to values $A\cdot\cos\theta$ and $A\cdot\sin\theta$ respectively are read out to the output circuit 27. The output circuit 27 selects upper six digits of the read out outputs by way of example. The numbers of digits of the read out outputs can be appropriately determined.

The two read out outputs of six digits are applied to the code converter 28 and converted to a code unit of six digits indicative of a positive value proportional to the amplitude A of the amplitude- and phase- modulated telegraphic wave. This conversion can be performed by a conversion table directly converting the two read out outputs to the above mentioned code unit of six digits. This converted code unit corresponds to amplitude-detection of the amplitude- and phase-modulated telegraphic wave. The converted code unit obtained from the code unit converter 28 is applied to an amplitude detector 29, which is the same as the amplitude detector 4 shown in FIG. 1 and described in details with reference to FIG. 2. Accordingly, the amplitude- and phase-modulated telegraphic wave are correctly demodulated for amplitude modulation.

As mentioned above, a signal obtained by amplitude-detection is converted to PCM code units or digital code units in accordance with digital detection in the system of this invention, and amplitude demodulation and automatic correction of a threshold level for the amplitude demodulation can be also performed by digital operation. Accordingly, high preciseness and stability and miniaturization of the device can be readily performed in accordance with this invention, while these merits cannot be obtained by conventional analogue circuitry.

What we claim is:

1. A system for demodulating at least one amplitude-modulated telegraphic wave, comprising:
   - envelope detector means for detecting an envelope of an amplitude-modulated telegraphic wave applied thereto, and for producing an envelope signal;
   - analogue-digital converter means for converting the said envelope signal to digital code units for each signal element of the amplitude-modulated telegraphic wave;
   - reference means for generating a reference code unit indicative of a threshold value for amplitude-demodulation of the amplitude-modulated telegraphic wave; and
   - comparison means for comparing the said digital code units with the reference code unit to produce a comparison output signal, so that the amplitude modulation of the amplitude-modulated telegraphic wave is demodulated in accordance with said comparison output signal.

2. A system for demodulating at least one amplitude modulated telegraphic wave according to claim 1, further comprising first memory means coupled to said comparison means for storing said comparison output signal until the occurrence of a said digital code unit corresponding to an immediately succeeding signal element of the amplitude-modulated telegraphic wave, detection means coupled to said comparison means and said first memory means for detecting a difference between a comparison result for an immediately preceding signal element of the amplitude-modulated telegraphic wave and a comparison result for an instant signal element thereof, and second memory means having an input coupled to said detection means for accumulating said difference to produce error code units, and means for applying said error code units to said reference means for successively modifying the reference code units so as to assume appropriate values in response to changes in the error code units.

* * * * *